United States Patent Office 3,215,676
Patented Nov. 2, 1965

3,215,676
POLYMERIC HYDROXY CARBOXYLIC ACIDS, DERIVATIVES THEREOF AND METHOD FOR PRODUCING THE SAME
Elliot Bergman, Berkeley, and William T. Tsatsos, San Mateo, Calif., assignors to Shell Oil Company, New York, N.Y., a corporation of Delaware
No Drawing. Filed Dec. 22, 1960, Ser. No. 77,508
15 Claims. (Cl. 260—73)

This invention relates to a new class of polymeric products and to their preparation. More particularly, the invention relates to new polymeric hydroxy carboxylic acids, to their preparation from unsaturated aldehyde polymers, and to valuable derivatives of the new acids and utilization of the same.

Specifically, the invention provides new and particularly useful polymeric hydroxy carboxylic acids, preferably having an intrinsic viscosity above about 0.5 dl./g., which polymeric products are obtained by treating and reacting a polymer of acrolein or beta-substituted acrolein, or water-soluble derivative thereof, preferably in an aqueous medium, with (1) a basic material having a dissociation constant greater than $2.0 \times 10^{-5}$, and preferably an alkali metal hydroxide, and (2) an aldehyde or ketone, and preferably formaldehyde or a material which liberates formaldehyde, and then converting the resulting product to the acid form, such as by addition of sulfuric or hydrochloric acid.

As a special embodiment, the invention provides new solid polymeric polyhydroxy polycarboxylic acids having an intrinsic viscosity between about 0.90 dl./g., and 4.0 dl./g. and having a plurality of structural units as

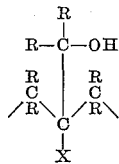

wherein X is —CH$_2$OH

or —COOH and R is hydrogen or an organic radical.

As a special embodiment, the invention provides new and valuable derivatives of the above-described polymeric hydroxy carboxylic acids, such as their acid halides, esters, ethers, amides, ethers, polyurethanes, and particularly their salts as their alkali metal and ammonium salts.

As a still further special embodiment, the invention provides a method for utilizing the water-soluble salts of the above-described new polymeric hydroxy carboxylic acids for the treatment of fibrous materials as textiles, paper and leather, and particularly for using the salts as sizing agents for textile materials and paper.

It is an object of the invention to provide a new class of polymeric products. It is a further object to provide a new class of polymeric products and a method for their preparation from polymers of acrolein and beta-substituted acroleins. It is a further object to provide new polymeric hydroxy and carboxyl-containing reaction products which have many unique properties which make them particularly useful and valuable in industry. It is a further object to provide new polymeric polyhydroxy polycarboxylic acids which may be molded to form valuable plastic articles. It is a further object to provide new polymeric polyhydroxy polycarboxylic acids which form valuable ester, ether, amide and salt derivatives. It is a further object to provide new polymeric polyhydroxy polycarboxylic acids which form water-soluble salts which are useful in the textile industry. It is a further object to provide new water-soluble salts of polymeric hydroxy carboxylic acids which are particularly useful for the treatment of fibrous materials. It is a further object to provide new sizing agents for yarns and paper. It is a further object to provide warp sizing agents which impart improved strength and abrasive resistance to cotton yarn and paper. It is a further object to provide a method for using water-soluble derivatives of the new polymeric acids as warp sizing agents. Other objects and advantages of the invention will be apparent from the following detailed description thereof.

It has now been discovered that these and other objects may be accomplished by the new products of the invention comprising polymeric polyhydroxy polycarboxylic acids, preferably having an intrinsic viscosity above about 0.90 dl./g., which polymeric products are obtained by treating and reacting a polymer of acrolein or beta-substituted acrolein, or water-soluble derivative thereof, preferably in an aqueous medium, with (1) a basic material having a dissociation constant greater than $2.0 \times 10^{-5}$, and preferably an alkali metal hydroxide, and (2) an aldehyde or ketone, and preferably formaldehyde or a material which liberates formaldehyde, and then converting the resulting product to the acid form, such as by the addition of an acid as sulfuric or hydrochloric acid. The products prepared in this manner have the unique structure of having in the main polymer chain a plurality of quaternary carbon atoms joined to a carbon atom bearing a —OH group and to a functional group a —CH$_2$OH

or —COOH, i.e., a plurality of groups as

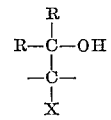

wherein X is a —CH$_2$OH

or —COOH. The products also contain a plurality of —COOH groups attached somewhere to a carbon atom in the main polymer chain, the —COOH groups being contained in the above-noted structure containing the quaternary carbon atom or in other parts of the molecule. The preferred products are those wherein at least 10% and preferably 30 to 95% of the units in the polymer chain are made up as follows:

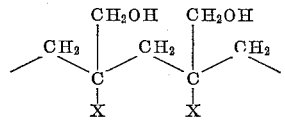

wherein X is —CH$_2$OH,

or —COOH.

The above-noted combined structural arrangement imparts many unusual and unexpected properties to the new polymers. It has been found, for example, that the resulting products may be molded to form plastic products having unusually high heat distortion points. The resulting products are also reactive to resinous materials, such as polyepoxides, and may react therewith to form hard insoluble infusible products.

The above-described new polymeric acids may also be used to form valuable derivatives, such as, for example, acid halides, esters, amide, polyurethane and salt derivatives. Valuable ether derivatives may also be formed through the —OH groups, as well as valuable ester and polyurethane derivatives formed through these OH groups.

The water-soluble salt derivatives have been found to be particularly useful as polyelectrolytes and especially as dispersing, emulsifying agents. They are superior in this regard to commercially available polymeric additives in that they give a greater viscosity and thixotropic effect and act as improved chelating agents to remove metals and the like.

The water-soluble salts have also been found to be useful as treating agents for fibrous materials, such as paper, textile fibers and fabrics, leather and the like. When applied to paper, they may act as sizing materials or as materials to improve flexibility as well as wet and dry strength. When applied to textiles they act to improve the hand and feel of the materials as well as increase crease and shrink resistance.

The water-soluble salts are particularly outstanding as warp sizing agents for textile fibers, and particularly cotton fibers and are superior in this regard to commercial agents now employed for this purpose.

The polymers used in the preparation of the new products include the addition-type polymers obtained by free radical polymerization of acrolein and beta-substituted acroleins, such as the aryl, arylkyl, alkyl, alkaryl-substituted acroleins, as beta-ethylacrolein, beta-phenylacrolein, beta-butylacrolein, beta-octylacrolein and the like.

The polymers include the homopolymers of the above-noted acroleins as well as the copolymers of the various acroleins or copolymers of one or more of the acroleins with other monomer or monomers containing an ethylenic group, and preferably a $CH_2=C=$ group. Examples of these include, among others, butadiene, isoprene, methylpentadiene, cyclopentadiene, chloroprene, ethylene, propylene, butylene, octene, vinyl acetate, vinyl propionate, vinylpyridine, vinylnaphthalene, styrene, vinylcyclohexane, acrylonitrile, methacrylonitrile, vinyl chloride, vinylidene chloride, acrylate esters, such as, for example, methyl methacrylate, ethyl acrylate, ethyl methacrylate, butyl acrylate, and allylic compounds, such as allyl acetate, allyl alcohol, allyl butyrate, allyl benzoate, allyl cyclohexanecarboxylate, allylamine, diallylamine, diallyl phthalate, diallyl succinate, and the like. These additional monomers are preferably employed in minor amounts, and in amounts preferably ranging from about 1% to 40%, and preferably in amounts ranging from about 1% to 25% by weight.

The polymers employed in the process of the invention may have molecular weights as low as 1000, but preferred polymers are those of high molecular weight and still more preferably those having molecular weights ranging from about 75,000 to 2,000,000, and more preferably between 100,000 and 1,000,000, as determined by the light scattering technique. The molecular weights may, and preferably are in many cases, referred to by intrinsic viscosity values as these are more easily determined. Preferred polymers are those having intrinsic viscosities (as determined on the solubilized form of the polymer) of at least 0.5 dl./g. and preferably at least 0.9 dl./g., with a preferred range being from 0.9 to 5.0 dl./g. These values are determined by conventional technique of polyelectrolyte viscosity measurements at 25° C.

The preferred polymers are those possessing a high theoretical aldehyde function, i.e., when the polymer is subjected to conventional tests for the presence of aldehyde groups (e.g., addition of hydroxylamine hydrochloride and titrated liberated $H_2O$ with Karl Fischer reagent) the results show a high percent, e.g., above 90%, and preferably 95% to 99%, of the theoretical aldehyde groups present as such or in the hydrated form. Many of the preferred polymers have the aldehyde groups present in the hydrated form as

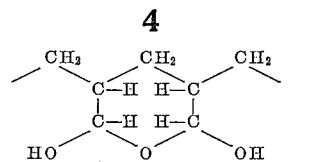

and some

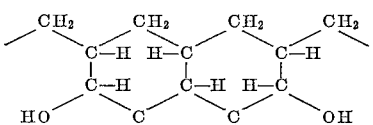

Many of the preferred polymers are also insoluble in water and insoluble in conventional solvents, such as benzene, toluene, acetone, and the like. They may be used as such or they may be converted to the soluble form as by treatment with various materials, such as sulfur dioxide, sodium sulfite, mercaptans, alcohols and the like.

The above-described acrolein polymers may be prepared by a variety of different methods. They may be prepared, for example, by heating the acrolein with free radical catalysts, such as peroxides as benzoyl peroxide, tertiary butyl hydroperoxide, tertiary butyl perbenzoate, tertiary butyl peracetate and the like, in bulk, emulsion or suspension systems.

Conversion of the water-insoluble polymers to soluble form may be accomplished by a variety of methods. The conversion is preferably accomplished by suspending the high molecular weight polymer in an aqueous solution containing the water-solubilizing agent, such as, for example, sulfur dioxide or an alkali bisulfite as sodium bisulfite. The amount of polymer added will vary depending on the particular agent involved and concentration of the agent. In general, it is preferred to add from 1 to 50 parts of the polymer of the agent. In general, it is preferred to add from 1 to 50 parts of the polymer per 100 parts of water. The concentration of the solubilizing agent will generally vary from about 1% to about 25%. Stirring and heating may be applied to assist in the dissolution. Temperatures employed will generally vary from about 20° C. to about 90° C. Various other means, such as addition of small amounts of acid catalysts or the addition of swelling agents, such as acetone, tetrahydrofuran, etc. may also be employed in the dissolution.

High molecular weight acrolein polymers and their soluble froms which give outstanding results in the process of the invention are described and claimed in copending patent application Serial No. 859,156, filed December 14, 1959, and copending application Serial No. 859,154, filed December 14, 1959, and so much of the disclosure of these two applications relative to these polymers and derivatives and their preparation is incorporated into this application.

The preparation of some of the acrolein polymers by the above-noted method is illustrated below.

POLYMER A 100 parts of acrolein was added to 400 parts of water, to this mixture was added .271 part of potassium persulfate, .203 part of ferrous chloride tetrahydrate, 1 part of nonyl-phenol-ethylene oxide adducts as anti-coalescent agent and .4 part of disodium salt of ethylene diamine tetraacetic acid. The resulting mixture was stirred for 24 hours at room temperature under atmosphere of nitrogen. During this period a white solid precipitated to the bottom. The mixture was filtered and the solid precipitate was washed with water and dried to yield 47 parts of polymer. The resulting product was a white powder polymer having an intrinsic viscosity (as determined on the sulfur dioxide solubilized form) of 1.8 dl./g.

POLYMER B 100 parts of acrolein was added to 300 parts of water and to this mixture was added .272 part potassium persulfate, .203 part of ferrous chloride tetrahydrate and .4 part of disodium salt of ethylene diamine tetraacetic acid. The resulting mixture was stirred for 25 hours at 0° C. under an atmosphere of nitrogen. During that period a white solid precipitated to the bottom. The mixture was filtered and the solid precipitate was washed with water and dried to yield 27 parts polymer. The resulting product was a white powder polymer having an intrinsic viscosity (as determined on the sulfur dioxide solubilized form) of 2.3 dl./g.

POLYMER C 1000 parts of acrolein was added to 2000 parts of water and to this mixture was added 2.73 parts of potassium persulfate, 2.02 parts ferrous chloride tetrahydrate, 10 parts of nonylphenol-ethylene oxide condensate and 4 parts of disodium salt of ethylene diamine tetraacetic acid. This mixture was stirred for 42 hours at room temperature (20° C.) under nitrogen. The resulting product was a white powder polymer having an intrinsic viscosity of 1.5.

POLYMER D 100 parts of acrolein was added to 325 parts of water and to this mixture was added 2.70 parts of potassium persulfate, 2.00 parts of ferrous chloride tetrahydrate and 4 parts of disodium salt of ethylene diamine tetraacetic acid. This mixture was kept at room temperature for 6 hours with stirring and under an atmosphere of nitrogen. The resulting 46 parts product was a white powder polymer having an intrinsic viscosity of 1.02 dl./g.

POLYMER E 10 parts of the solid Polymer A prepared as above was added to aqueous $SO_2$ solution and the mixture heated to 50° C. After a few minutes, the polymer dissolved to form a clear solution. Analysis indicated the polymer contained plurality of structural units

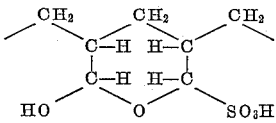

POLYMER F 10 parts of the solid Polymer B prepared as above was added to water to form a suspension thereof. Sodium bisulfite was then added and the mixture heated to 50° C. After a few minutes, the polymer dissolved to form a clear solution. Analysis indicated the polymer contained a plurality of the structural units noted above for Polymer E.

The new polymeric polyhydroxy polycarboxylic acids of the present invention are prepared by treating and reacting the above-described polymers of the unsaturated aldehydes or water-soluble derivative thereof with a basic material which has a dissociation constant greater than $2.0 \times 10^{-5}$ and an aldehyde or ketone. This process has the advantage over use of the straight base in that all polymers of acrolein (regardless of solubility in straight base) can be utilized in the reaction and converted to the desired products.

The basic materials used in the reaction are preferably the alkali metal hydroxides, alkaline earth metal hydroxides, ammonium hydroxide, strong amines and the like. Preferred materials to be employed are the water-soluble hydroxides and basic salts of the alkali metals, sodium, potassium, lithium and ammonium hydroxide and basic salts. The pH value of the reaction mixture is preferably between about 7.1 and 14. When expressed on a normality basis, it is preferred to use reaction media having a normality greater than 0.01 N, and preferably between 0.09 N and 2 N.

The degree of alkalinity employed will vary depending on the degree of conversion of the aldehyde or hydrated aldehyde groups to the OH and carboxyl groups. Theoretically one mole of caustic is needed for every two aldehyde groups converted. To obtain high degree of conversions, e.g., 70% to 90% conversions, solutions of higher normality should be employed, while for the lower conversions lower normality may be utilized. Preferably from 10% to 95% of the groups are converted to the OH and carboxyl groups.

The other material employed in the reaction comprises an aldehyde or ketone or mixtures thereof. Examples of aldehydes include, among others, formaldehyde and materials liberating formaldehyde as trioxane, paraformaldehyde and the like, acetaldehyde, propionaldehyde, chloropropionaldehyde, butyraldehyde, isobutyraldehyde, valeroaldehyde, 2-pyrancarboxaldehyde, tetrahydropyran-2-carboxyaldehyde, 2-furaldehyde, crotonaldehyde, benzaldehyde, 1-naphthaldehyde, durene dialdehyde, glutaraldehyde, 1-cyclohexene-1-carboxyaldehyde, and 2,4-heptadiene-1-carboxaldehyde. Preferred aldehydes to be used include those of the formula

wherein R is hydrogen or a hydrocarbon radical, and preferably the aliphatic, cycloaliphatic and aromatic monoaldehydes containing from 1 to 20 carbon atoms, and still more preferably 1 to 12 carbon atoms. Formaldehyde and materials which liberate formaldehyde come under special consideration as the resulting products have particularly outstanding properties for the formation of warp sizing agents for fiberous materials.

Other materials that may be used in place of or in admixture with the above-described aldehydes include the ketones, and preferably the monoketones, such as, for example, methyl ethyl ketone, methyl isobutyl ketone, dimethyl ketone, diethyl ketone, dibutyl ketone, diisobutyl ketone, ethyl octyl ketone, methyl phenylketone, methyl cyclohexyl ketone, dioctyl ketone, allyl methyl ketone, methyl isopropenyl ketone, beta-chloroallyl methyl ketone, methoxymethyl butyl ketone, and the like. Preferred ketones include those of the formula

wherein R is a hydrocarbon radical. Especially preferred are the aliphatic, cycloaliphatic, aromatic monoketones containing from 3 to 20 carbon atoms, and still more preferably from 3 to 12 carbon atoms. Dialkyl ketones come under special consideration.

The amount of the aldehyde or ketone employed will vary depending on the degree of conversion of the hydrogen atoms on the alpha carbon atom relative to the aldehyde or hydrated aldehyde groups to the

groups. Theoretically one mole of aldehyde or ketone is needed for every unit of aldehyde in the polymer chain to be converted. Preferably from 5% to 95% of the said hydrogen are converted, and still more preferably from 10% to 90% of the said hydrogen.

The reaction may be accomplished in an aqueous medium or in an inert solvent medium, such as in alcohol and the like. Best results, however, are obtained when conducted in an aqueous medium.

Dilute solutions or suspensions of the polymer are preferred. The concentration of the polymer in the reaction mixture will preferably vary from about 0.01% to 5% and more preferably from 0.1% to 4%.

The temperature employed in the reaction will generally range from about 0° C. to as high as 60° C. Preferred temperatures range from about 15° C. to 50° C. Atmospheric, subatmospheric or superatmospheric pressures may be utilized as desired.

In most cases, the polymers will dissolve in the alkaline reaction medium in a few minutes and the reaction should be complete in the matter of a few hours. Reaction times generally vary from about 20 minutes to about 50 hours.

At the conclusion of the reaction, acid is then added to convert the reaction product to the acid form. This is accomplished by merely adding acids, such as hydrochloric, sulfuric or the like in dilute form to the mixture until the product precipitates. This is at about a pH of 3 to 5. The precipitate is then preferably washed with water and dried.

The new polymeric hydroxy carboxylic acids of the present invention will vary from very thick liquids to solids depending on the starting polymer, the high molecular weight polymers, e.g., those having intrinsic viscosities above 0.6 dl./g. giving solid hydroxy carboxylic acids. The new acids will have a plurality of free carboxyl groups and free OH groups which are present chiefly as active

groups. The new acids will also have aldehyde or hydrated aldehyde groups in the event the above-noted conversion to the OH and carboxyl group has not been 100%.

In most cases, the new products will have better solubility characteristics than the starting polymers. Thus, while the starting polymers are generally insoluble in basic materials, such as NaOH, the new products are soluble in such materials. While some of the new products may be insoluble in water they can be made water-soluble by formation of the water soluble salt. The new acids will have substantially the same or higher molecular weight as there is very little if any degradation taking place during the above treatment.

The new polymeric hydroxy carboxylic acids of the present invention may be used for a variety of important applications. They can be molded, for example, to form hard plastic materials having good strength and very high heat resistance. Examples of molded materials, for example, have heat distortion points of the order to 150° C. and higher.

The new polymeric hydroxy carboxylic acids are also useful as cross-linking agents for polyepoxides, and preferably the polyglycidyl ethers of polyhydric alcohols or polyhydric phenols. Examples of polyepoxides that may be cured are set out in U.S. 2,633,458.

Salts of the new polymeric hydroxy carboxylic acids, and preferably the ammonia, alkali metal or alkaline earth metal salts, are valuable as dispersing agents and emulsifying agents, self-polishing waxes, wet and dry strength improving agents for paper, sizing agents for paper and textile fibers, crease and shrink-proofing agents for textiles and the like.

Salts of the polymeric hydroxy carboxylic acids, and preferably those of the polyvalent metals, each as, for example, cobalt, iron manganese, lead, copper, vanadium, cadmium, strontium and the like, may be used as stabilizers for halogen-containing polymers such as poly-vinylchloride), and as paint driers, insecticides, woodpreserving agents, additives for lubricating oils and the like.

The salts may be prepared by any conventional technique as by reacting the new acids with inorganic salts or hydroxides of the desired metals, such as NaOH, KOH, copper sulfate, zinc sulfate, magnesium chloride and the like, preferably in the presence of a diluent as water, alcohol, and the like. Some of the salts are formed during the initial preparation of the acid so in that case it will not be necessary to convert to the acid and then back to the salt, but the salt may be recovered directly from the reaction mixture. The salts may be recovered by evaporation, distillation of the diluent, crystallization and the like. The salts are recovered as solids and preferably crystalline solids.

The water-soluble salts of the present invention are particularly outstanding as warp sizing agents for textile materials. Such materials impart improved strength and abrasion resistance to the textile materials, and particularly cellulosic materials. The application of the salts to the textile material may be effected in any suitable manner, the method selected depending upon the results desired. If it is desired to apply the solution only to one surface of the materials, as, for example, when it is desired to treat the back only of a fabric having a face of artificial or natural silk and a cotton back, the application may be effected by spraying as a liquid or gas or by means of rollers, or the composition may be spread upon the surface by means of a doctor blade. When, however, it is desired to coat both surfaces of the material, or if the material is to be thoroughly impregnated with it, the material may be simply dipped in the solution or run through conventional-type padding rollers. The solutions may also be applied locally to the material, for example, by means of printing rollers or by stencilling.

The amount of the salts to be deposited on the material varies over a wide range. In general, it is preferred to deposit from about .1% to 5% by weight of the salt on the textile material. If stiffer materials are required, the amount may go as high as 20% or higher.

If the desired amount of salt to be deposited is not obtained in one application, the solution can be applied as many times as desired in order to bring the amount of salt up to the desired level.

After the desired amount of salt has been applied, the treated material is preferably dried. This is generally accomplished by exposing the wet material to hot gas at temperatures ranging from about 40° C. to 120° C. The period of drying will depend largely on the amount of pick-up permitted during the application of the solution and the concentration of the salt solution. In most instances, drying periods of from about 1 to 30 minutes should be sufficient.

The sizing prepared from the water-soluble salts, such as the sodium salt, may be removed after it has served its purpose by simply washing the treated material.

The above-described process may be utilized for the treatment of any fibrous material. This includes textile material, such as woven fabrics, non-woven fabrics, threads, yarn, cord, and string, paper, and the like. These materials may be prepared from natural or synthetic materials, such as cotton, linen, natural silk and artificial silk, such as silk obtained from cellulose acetate or other organic esters or ethers of cellulose, rayons, jute, hemp, animal fibers, such as wood, hair, and the like as well as synthetic materials which includes, among others, those prepared from acrylonitrile (Orlon-100% acrylonitrile polymer), vinylidene cyanide polymers, polyamides (Nylon-super polyamide), polyester-polyamides, cellulose esters and ethers, and polymers prepared from corn protein and formaldehyde (Zein). This includes the homopolymers as well as copolymers and terpolymers, such as, for example, Acrilan (85% acrylonitrile and 15% vinyl acetate), Dynel (60% vinyl chloride and 40% acrylonitrile). The fibrous material may be colorless or may be dyed, printed or otherwise colored to the desired shade.

The material treated as noted above have many improved properties. The fibers, yarn and the like, prepared from materials as cotton and other cellulosic materials have improved warp sizing properties, such as strength and abrasion resistance. Other textile materials have improved dry strengths, resistance to shrinkage and the like. The paper has better dry strength, fold endurance and abrasion resistance.

The products treated as above may be utilized for any of the conventional applications, such as in the manufacture of dresses, drapes, upholsteries, shoe fabrics, carpets, coats, shirts, and the like.

Amides of the novel polymeric hydroxy carboxylic acids are of value as insecticides, fungicides or herbicides or as additives for insecticidal, fungicidal or herbicidal compositions. The amides are also useful as additives for resinous compositions, particularly those of the alkyd-type or as plasticizers and additives for resins, oils and the like. Amides containing an unsaturated linkage on the nitrogen atom may be polymerized or cross-linked through addition polymerization. The amides may be prepared by reacting the polymeric hydroxy carboxylic acid with ammonia or an amine according to the conventional procedure. Amines that may be used include, among others, mono- and polyamines as alkyl amine, methallyl amine, isopropyl amine, decyl amine, phenyl amine, cyclohexylamine, ethylene diamine, diethylene triamine, metaphenylene diamine and the like. A detailed description of a suitable method for making the amides may be found in U.S. 2,832,799.

Valuable nitrile derivatives may also be obtained by dehydrating the above-described amides and amines may be obtained by reducing the amides.

Esters having beneficial properties may be derived from the novel polymeric hydroxy carboxylic acids either by esterfying the OH groups with mono- or polybasic acids or the COOH groups with monohydric or polyhydric alcohols. Preferred derivatives are obtained by esterifying the COOH groups with monohydric alcohols or phenols, and polyhydric alcohols or phenols containing up to 25 carbon atoms. Such compounds include, among others, methanol, ethanol, butanol, amyl alcohol, octyl alcohol, nonyl alcohol, cyclohexanol, cyclopentanol allyl alcohol, methallyl alcohol, butenol, phenol, benzyl alcohol, glycol monobutyrate, glycerol diacetate, glycerol, pentaerythritol, 1,2,6-hexanetriol, butanediol, 2,8-dodecanediol, glycerol allyl ether, 3,3'-thiodipropanol, 4,4'-sulfonyldibutanol and polyallyl alcohol and the like.

The polymeric hydroxy carboxylic acids may also be reacted with polyols, such as glycerol, pentaerythritol, hexanetriol, butanediol, ethylene glycol, polyethylene glycol, polypropylene glycol and the like, and with or without modifying agents to form valuable alkyd type resins. Suitable methods for making the alkyd resins may be found in U.S. 2,734,876.

Esters having properties as additives for vinyl halide polymers and the like so as to impart stabilization thereto include the esters of the polymeric hydroxy carboxylic acids and monohydric alcohols containing from 1 to 12 carbon atoms, and preferably the aliphatic saturated and unsaturated alcohols containing from 1 to 10 carbon atoms.

The new esters may be prepared by heating the polymeric acids with the desired alcohols preferably in the presence of an esterification catalyst, such as p-toluenesulfonic acid, sulfuric acid and the like. Temperatures generally vary from about 50° C. to 100° C. The esters may be recovered by distillation, extraction and the like.

The new hydroxy carboxylic acids may also be converted to inner lactones by application of heat and preferably by heating in the presence of acid catalysts. The new products may also be converted to acid halides by reaction with halogens according to conventional techniques. The acids may also be converted to anhydrides or mixed anhydrides.

Polyurethane derivatives may be obtained by reacting the new acids with organic polyisocyanates or polyisothiocyanates. These compounds generally have the formula XCNRNCY wherein X and Y are selected from the group consisting of sulfur and oxygen and R is a divalent organic radical. The organic radical may be aliphatic, cycloaliphatic, aromatic, or heterocyclic and may be saturated or unsaturated. Examples of these compounds include, among others, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, trimethylene diisocyanate, hexamethylene diisocyanate, ethylene diisocyanate, cyclohexylene diisocyanate, octamethylene diisocyanate, pentamethylene diisocyanate, nonmethylene diisocyanate, octodecamethylene diisocyanate, 2-chloro-propane diisocyanate, 2,2'-diethylether diisocyanate, 3(dimethylamine) pentane-diisocyanate, tetra-chloro-phenylene diisocyanate-1,4. Still other polyisocyanates or polyisothiocyanates that may be used are the higher molecular weight polyisocyanates obtained by reacting polyhydric alcohols, such as alkane and alkene polyols as glycerol, 1,2,6-hexanethanol, 1,5-pentanediol, ethylene glycol, polyethylene glycol, and the like with an excess of any of the above-described isocyanates.

The reaction between the organic polyisocyanate or polyisothiocyanate and the new acids may be carried out in a variety of ways. Reaction is preferably accomplished by merely mixing the two or more reactants together at 10° C. to 175° C.

The proportions in which the reactants may be combined can be carried widely, depending chiefly on the intended applications. If one desires to utilize the product in the formation of coating and impregnating compositions, such as may be air dried or baked, it is generally preferred to employ the reactants in chemically equivalent amounts up to a slight excess, e.g., 1 equivalent excess, of the polyisocyanate or polythioisocyanate. As used herein and in the claims, chemically equivalent amounts refers to the amount needed to furnish one icocyanate group per hydroxyl group. If one desired to first form higher molecular weight products having free isocyanate groups which may be subsequently cured by contact with moisture or other means, it is generally desirable to utilize a large excess of the polyisocyanate or polythioisocyanate. In this latter case, it is generally preferred to combine the acid and the isocyanate reactant in chemical equivalent ratios varying from about 1:2 to 1:5. Hydroxy-containing higher molecular weight products can be obtained by utilizing the resinous polyol in excess, e.g., 1 to 3 mol excess.

The temperature employed in the reaction may also vary over a wide range. If one desires to prepare mixtures for use in making coatings as described above wherein the components are combined in approximately chemical equivalent amounts or with slight excess of the isocyanate reactant, it is preferred to use temperatures which may vary from room temperatures or below, e.g., 10° C. to 15° C., up to and including baking at temperatures of 100° C. to 175° C. In this case, the components are preferably combined at or near room temperature, such as temperatures ranging from 15° C. to 25° C. In the preparation of the high molecular weight isocyanate adducts using a large excess of the isocyanate, the reactants may be combined at room temperature or preferably heated say at temperatures ranging from about 40° C. to about 150° C.

It is sometimes advantageous to carry out the reaction under a blanket of inert gas, such as nitrogen carbon dioxide ethane and the like. Atmospheric, superatmospheric, or subatmospheric pressures may be employed.

Valuable ether derivatives may also be obtained by etherifying the OH groups with alcohols or phenols.

Valuable derivatives may also be formed by further reacting the products through the aldehyde groups that will also be present. Thus, the products may be reacted with mercaptans, amines and the like. They may also be oxidized to convert the aldehyde groups and/or OH groups to carboxyl groups so as to form a long chain polyacid, or the new products may also be reduced to form polyhydroxy compounds.

To illustrate the manner in which the invention may be carried out, the following examples are given. It is to be understood, however, that the examples are for the purpose of illustration and the invention is not to be regarded as limited to any of the specific conditions or reactants cited therein. Unless otherwise specified, parts described in the examples are parts by weight.

*Example I*

This example illustrates the preparation of a polymeric hydroxy carboxylic acid from a polyacrolein having an intrinsic viscosity of 1.6 dl./g., sodium hydroxide and formaldehyde.

310 parts of a solid polyacrolein having an intrinsic viscosity of 1.6 dl./g. and containing 88.5% water was mixed with 300 parts of water and 25 parts of 37% formalin. 1200 parts of 1 N NaOH was added to this solution at 5° C. under nitrogen with stirring. The mixture was then allowed to stand at room temperature with stirring. After standing several days, the mixture was diluted with 2000 parts of water. This mixture was made acid to pH of 2.5 with 240 parts of 5 N sulfuric acid. A white granular polymer precipitated. The polymer identified as a polyhydroxy polycarboxylic acid had an intrinsic viscosity of about 1.6 dl./g., an OH value of 0.778 eq./100 g., acidity of 0.4 eq./100 g. and carbonyl value of 0.354 eq./100 g.

The above-described polymer was molded at 250° C. to form a hard plastic molding. The product had an Izod impact of 0.49 ft./lbs./in. and heat distortion of 155° C.

A sodium salt of the above-described polyhydroxy polycarboxylic acid was prepared by the addition of sodium hydroxide. A 2% solution of the salt was used to impregnate cotton yarn by conventional padding technique. The yarn was dried and then tested for force at break, elongation at break and abrasion resistance (as indicated by the number of cycles of wear before break). The results are shown below in comparison to the results obtained with a commercial sizing agent, a product obtained by reacting polyacrolein with just the alkali plus addition of glycerol, and a control:

| Warp Sizing Material | Force at Break | Elongation at Break, Percent | Abrasion in Cycles |
| --- | --- | --- | --- |
| Sodium salt of polymer produced above. | 574 | 8 | 2,893 |
| Commercial material (5% oxidized starch) | 586 | 7.9 | 1,356 |
| Polymer treated only with alkali-plus glycerol | 658 | 5.3 | 1,817 |
| Control | 515 | 7.8 | 125 |

From the above, it is apparent that the new sodium salt gives an unexpected improvement in the resistance to abrasion.

Further advantage is also found in the fact that the new sodium salts can be easily removed from the yarn by washing while the commercial material was quite difficult to remove.

*Example II*

415 parts of polyacrolein having an intrinsic viscosity of 1.6 dl./g. and containing 88.5% water was mixed with 400 parts of water and 42 parts of 37% formalin. 2000 parts of 1 N NaOH was added to this solution at 5° C. with stirring under nitrogen. The mixture was allowed to stand at room temperature for several days. The mixture made acid to pH of 2.5 with 400 parts of 5 N sulfuric acid. A white granular polymer precipitated. The polymer identified as a polyhydroxy polycarboxylic acid had an intrinsic viscosity of 1.6 dl./g., an OH value of 1.404 eq./100 g., acid value of 0.39 eq./100 g. and a carbonyl value of 0.33 eq./100 g.

The above-described polymer was molded at 250° C. to form a hard plastic molding.

A sodium salt of the above-described polyhydroxy polycarboxylic acid was prepared by the addition of sodium hydroxide. A 2% solution of the salt was used to impregnate cotton yarn by conventional padding technique. The yarn was dried and then tested as in Example I. The yarn had a force at break of 569, an elongation at break of 8% and abrasion cycle value of 2275.

*Example III*

Examples I and II are repeated with the exception that the polyacrolein used in the initial reaction had an intrinsic viscosity of 1.0 dl./g. and 2.8 dl./g. Related results are obtained.

*Example IV*

Examples I and II are repeated with the exception that the hydroxy carboxylic acid is employed in the preparation of an ammonium salt. This salt also gave very high abrasion cycle values when applied as a warp sizing agent for cotton yarn.

*Example V*

75 parts of polyacrolein having an intrinsic viscosity of 1.6 dl./g. and containing 85.5% water was stirred with 50 parts of water and 25 parts of 37% formalin solution. 1500 parts of 0.2 N NaOH was added to this solution at 5° C. under nitrogen with stirring. The mixture was stirred at room temperature for several days. The mixture was then made acid by addition of 5 N sulfuric acid. A white granular polymer precipitated. The polymer identified as a polyhydroxy polycarboxylic acid had an intrinsic viscosity of about 1.6 dl./g., and OH value of 1.258 eq./100 g., acidity of 0.4 eq./100 g. and a carbonyl value of 0.416 eq./100 g.

The above-described polymer was molded at 250° C. to form a hard plastic molding having a high heat distortion point.

Sodium, potassium and ammonium salts prepared from the above-described hydroxy carboxylic acid polymer are prepared and used as warp sizing agents for cotton yarn as shown in Example I. Related results are obtained.

*Example VI*

160 parts of polyacrolein having an intrinsic viscosity of 1.5 dl./g. and containing 85.5% water was mixed with 150 parts of water and 8 parts of 37% formalin. To 310 parts of this mixture was added 800 parts of 1 N TiOH at 5° C. under nitrogen with stirring. This mixture was then allowed to stand at room temperature with stirring. After standing several days, the mixture was diluted with water and made acid to pH of 2.5 by addition of 5 N sulfuric acid. A white granular polymer precipitated. The polymer identified as a polyhydroxy polycarboxylic acid had an intrinsic viscosity of about 1.5 dl./g., an OH value of 0.8 eq./100 g., an acidity of .4 eq./100 g. and a carbonyl value of 0.3 eq./100 g.

A sodium salt of the above-described polymer was prepared by the addition of sodium hydroxide. A 2% solution of the salt was used to impregnate cotton yarn by conventional padding technique. The yarn was dried and then tested as in Example I. The yarn had a force at break of 569, an elongation at break 8% and an abrasion cycle value of 3647.

*Example VII*

80 parts of a polyacrolein having an intrinsic viscosity of 1.6 dl./g. and containing 82% water was mixed with 80 parts of a 37% formalin solution. To this mixture was added 200 parts of an 0.1 N NaOH solution under nitrogen with stirring. The mixture was stirred at room temperature for several days. The mixture was then filtered and made acid by addition of 5 N sulfuric acid. A white granular polymer precipitated which was identified as a polymeric hydroxy carboxylic acid having an intrinsic viscosity of about 1.6 dl./g., an OH value of 0.82 eq./100 g., acidity of 0.3 eq./100 g., and carboxyl value of 0.600 eq./100 g.

The above-described polymer was molded at 250° C. to form a hard plastic product having a high heat distortion point.

Sodium, potassium and ammonium salts are prepared from the above-described polymer and used as warp sizing agents for cotton yarn as shown in Example I. Related results are obtained.

Example VIII 800 parts of polyacrolein having an intrinsic viscosity of 1.6 dl./g. and containing 85% water was mixed with 800 parts of water and 160 parts of 37% formalin. To this mixture was added 5000 parts of 0.5 N NaOH at 5° C. under nitrogen with stirring. The mixture was stirred at room temperature for several days. The mixture was then made acid by addition of 5 N sulfuric acid. A white granular polymer precipitated. The polymer was identified as a polymeric hydroxy carboxylic acid.

A sodium salt of the above-described hydroxy carboxylic acid was prepared by the addition of sodium hydroxide. A 2% solution of the salt was prepared to impregnate cotton yarn by conventional padding technique. The yarn was dried and tested as in Example I. The yarn had an abrasion cycle value of 2633.

Example IX

This example illustrates the preparation of a polymeric hydroxy carboxylic acid from a copolymer of acrolein and ethyl acrylate having an intrinsic viscosity of 1.0 dl./g. sodium hydroxide and formaldehyde.

87 parts of a 70:30 copolymer of acrolein and ethyl acrylate containing 55% water and having an intrinsic viscosity was mixed with 300 parts of water and 40 parts of 37% formalin. To 87 parts of this mixture was added 1500 parts of 0.5 N NaOH at 5° C. under nitrogen. The mixture was then allowed to stand at room temperature with stirring. The mixture after 2 days was made acid by adding 5 N sulfuric acid. A white granular polymer precipitated. The polymer was identified as hydroxy carboxylic acid having in OH value of 0.726 eq./100 g., acidity of 0.55 eq./100 g. and a carbonyl value of 0.241 eq./100 g.

The above-described polymer was molded at 250° C. to form a hard plastic product.

Sodium potassium and ammonium salts are prepared from the above-described polymer and used as warp sizing agents for cotton yarn as shown in Example I. Related results are obtained.

Example X

Example IX was repeated with the exception that the copolymer employed was as follows: copolymer of 50 parts acrolein and 50 parts methyl acrylate; copolymer of 70 parts acrolein and 30 parts acrylonitrile; and a copolymer of 70 parts of acrolein and 30 parts of methyl ethyl ketone. Related results are obtained.

Example XI

Example I to IV and X are repeated with the exception that benzaldehyde is used in place of formaldehyde. Related results are obtained.

Example XII

Examples I to IV and X are repeated with the exception that methyl ethyl ketone and ethyl butyl ketone are used in place of formaldehyde. Polymeric hydroxy carboxylic acids are obtained.

We claim as our invention:

1. A member of the group consisting of (1) polymeric polyhydroxy polycarboxylic acids having an intrinsic viscosity of at least 0.5 dl./g. as determined on the solubilized form of the polymer; at least 10% of the units in the polymer having the structure

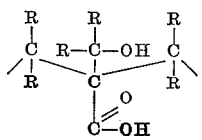

and the rest of the units having the structure

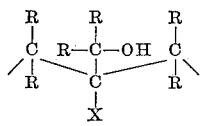

wherein R is a member of the group consisting of hydrogen and hydrocarbon radicals and X is a member of the group consisting of $-CH_2OH$,

and $-COOH$, and (2) salts of the aforedescribed polymeric polyhydroxy polycarboxylic acids wherein the COOH groups of the acids have been converted to $-COOX$ groups wherein X is a member of the group consisting of alkali metals and alkaline earth metals.

2. Polymeric hydroxy carboxylic acids as defined in claim 1 wherein the products are solid, substantially water-insoluble and have an intrinsic viscosity above 0.90 dl./g. as determined on the solubilized form of the polymer.

3. Polymeric hydroxy carboxylic acids as defined in claim 1 wherein the products have an intrinsic viscosity between about 0.9 and 4.0 dl./g. as determined on the solubilized form of the polymer.

4. Solid polymeric hydroxy carboxylic acid having a plurality of structural units as

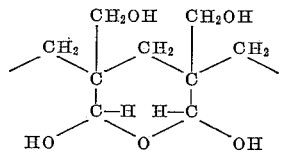

and a plurality of units

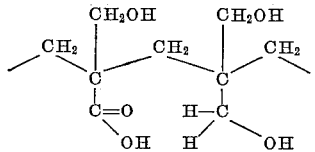

which polymer has an intrinsic viscosity above 0.90 dl./g. as determined on the solubilized form of the polymer.

5. A polyacrolein having an intrinsic viscosity of at least 0.5 dl./g. as determined on the solubilized form of the polymer having up to 90% of the hydrated aldehyde groups

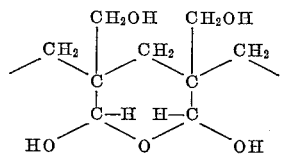

converted to

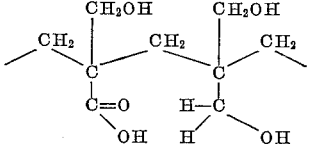

6. Salts of the polymeric hydroxy carboxylic acid defined in claim 4 wherein the COOH groups of the said acid are converted to COOX groups wherein X is an alkali metal.

7. An alkali metal salt of the polymeric hydroxy carboxylic acid defined in claim 5 wherein the COOH groups of the said acid are converted to COOX groups wherein X is an alkali metal.

8. A sodium salt of the polymeric hydroxy carboxylic acid defined in claim 5 wherein the COOH groups of the said acid are converted to COOX groups wherein X is sodium.

9. A process for preparing a polymeric hydroxy carboxylic acid from a water-insoluble polymer of an ethylenically unsaturated aldehyde wherein the polymer contains at least 60% by weight of the unsaturated aldehyde units and has an intrinsic viscosity of at least 0.5 dl./g. as determined on the solubilized form of the polymer which comprises treating and reacting the polymer of the ethylenically unsaturated aldehyde simultaneously with a basic material having a dissociation constant greater than $2.0 \times 10^{-5}$ and a member of the group consisting of aldehydes, ketones and materials which liberate the aforementioned members and then converting the resulting product to the acid form, said basic material being employed in the reaction mixture in an amount of at least 1 mole per two aldehyde groups on the aldehyde polymer to be reacted.

10. A process for preparing a polymeric hydroxyl carboxylic acid from a solid substantially water-insoluble high molecular weight addition polymer of acrolein containing at least 60% by weight of acrolein units having an intrinsic viscosity of at least 0.5 dl./g. as determined on the solubilized form of the polymer which comprises simultaneously reacting in an aqueous medium the aforementioned polymer of acrolein, an alkali metal hydroxide and formaldehyde, and then converting the resulting product to the acid form, said alkali metal hydroxide being employed in the reaction mixture in an amount of at least 1 mole per two aldehyde groups on the acrolein polymer to be reacted.

11. A process for preparing a polymeric hydroxy carboxylic acid from a solid substantially water-insoluble polyacrolein which comprises reacting simultaneously the polyacrolein having an intrinsic viscosity of at least 0.5 dl./g. as determined on the solubilized form of the polymer in an aqueous medium with an alkaline material and formaldehyde at a temperature between 0° C. and 60° C. and then converting the resulting product to the acid form, said alkaline material being employed in the reaction mixture in an amount of at least 1 mole per two aldehyde groups on the polyacrolein to be reacted.

12. A process as in claim 10 wherein the alkali metal is sodium hydroxide.

13. A process as in claim 10 wherein the alkali metal is lithium hydroxide.

14. A process as in claim 10 wherein the alkali metal hydroxide is sufficient to convert up to 90% of the aldehyde groups to the OH and carboxyl groups and the amount of the formaldehyde is sufficient to convert at least 10% of the hydrogen on the carbon atom alpha to the aldehyde group to methylol groups.

15. A solid polymeric hydroxy carboxylic acid having an intrinsic viscosity of at least 0.5 dl./g. as determined on the solubilized form of the polymer and containing as repeating units

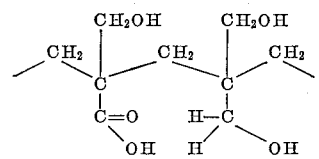

References Cited by the Examiner

UNITED STATES PATENTS

| | | | |
|---|---|---|---|
| 2,809,186 | 10/57 | Smith | 260—67 |
| 3,079,357 | 2/63 | Fischer et al. | 260—73 |

FOREIGN PATENTS 797,459  7/58  Great Britain.

OTHER REFERENCES

Kern et al.: Naturwissensch, 45,440 (1958).

WILLIAM H. SHORT, *Primary Examiner.*

MILTON STERMAN, NORMAN G. TORCHIN,
*Examiners.*